US011063869B2

(12) United States Patent
Rajendiran et al.

(10) Patent No.: US 11,063,869 B2
(45) Date of Patent: Jul. 13, 2021

(54) ARP TABLE MANAGEMENT SYSTEM

(71) Applicant: Dell Products L.P., Round Rock, TX (US)

(72) Inventors: Ganapathi Rajendiran, Cuddalore (IN); Goutham Sundar Selvaraj, Chennai (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/666,127

(22) Filed: Oct. 28, 2019

(65) Prior Publication Data

US 2021/0126861 A1    Apr. 29, 2021

(51) Int. Cl.
*H04L 12/741* (2013.01)
*H04L 29/12* (2006.01)

(52) U.S. Cl.
CPC .......... *H04L 45/745* (2013.01); *H04L 61/103* (2013.01)

(58) Field of Classification Search
None
See application file for complete search history.

(56) References Cited

U.S. PATENT DOCUMENTS

| 10,805,202 B1* | 10/2020 | Koppula | H04L 45/741 |
| 2014/0269729 A1* | 9/2014 | Luo | H04L 12/56 370/392 |
| 2015/0312137 A1* | 10/2015 | Li | H04L 45/16 709/238 |
| 2019/0297050 A1* | 9/2019 | Chu | H04L 47/20 |
| 2020/0036622 A1* | 1/2020 | Tamizkar | H04L 45/18 |

* cited by examiner

*Primary Examiner* — Mohammad S Adhami
(74) *Attorney, Agent, or Firm* — Haynes and Boone, LLP (57) ABSTRACT

An ARP table management system maps destination addresses to next hop addresses using ARP entry and egress tables and, when the ARP egress table is full, performs those mappings in double-entries in the ARP entry table. When a second destination address is identified that is associated with a first next hop address mapped to a first destination address in a first double-entry in the ARP entry table, a second next hop address is identified in the ARP egress table that is mapped to only one third destination address in the ARP entry table. The third destination address is then mapped to the second next hop address in a second double-entry in the ARP entry table, and each of the first destination address and the second destination address in respective ARP entry rows in the ARP entry table are mapped to the first next hop address in the ARP egress table.

20 Claims, 8 Drawing Sheets

ARP TABLE MANAGEMENT SYSTEM

BACKGROUND

The present disclosure relates generally to information handling systems, and more particularly to managing Address Resolution Protocol (ARP) tables utilized by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, sometimes utilize the Address Resolution Protocol (ARP) for the forwarding of data packets. As will be appreciated by one of skill in the art, the ARP is a communication protocol that is used for the discovery of link layer addresses (e.g., Media Access Control (MAC) addresses) associated with respective internet layer addresses (e.g., Internet Protocol version 4 (IPv4) addresses) via a mapping of those link layer addresses with their respective internet layer addresses in ARP tables in the switch device. For example, the ARP tables discussed above may include an ARP entry table (e.g., an "L3_ENTRY_IPV4_UNICAST" table) that is configured to store destination internet layer addresses (e.g., IPv4 addresses identified in received data packets) in association with next hop index values, and an ARP egress table (e.g., an "EGR_L3_NEXT_HOP" table) that is configured to store next hop link layer addresses (e.g., MAC addresses obtained via ARP operations) in association with next hop index values. As would be understood by one of skill in the art, the mapping between the internet layer addresses and link layer addresses discussed above is achieved via the next hop index values, with any particular internet layer address mapped to an associated link layer address via the use of the same next hop index value associated with that internet layer address and link layer address in the ARP entry table and ARP egress table, respectively. However, the inventors of the present disclosure have discovered that the conventional management of ARP tables may result in a less than optimal utilization of those ARP tables.

For example, the ARP egress table is typically smaller in size than the ARP entry table, and thus will fill up prior to the ARP entry table. In such situations, subsequent internet layer addresses received in data packets and their associated link layer addresses obtained via ARP operations are stored in the ARP entry table as "double entries" that utilize two entry rows in the ARP entry table (e.g., a first ARP entry row in the ARP entry table that identifies the internet layer address, and a second ARP entry row in the ARP entry table that identifies the link layer address.) Furthermore, when the ARP egress table is full and different internet layer addresses are received in different data packets and are associated with the same link layer address, conventional ARP table management systems will provide each of those internet layer address/link layer address mappings with respective double entries in the ARP entry table. As discussed in further detail below, such conventional ARP table management systems do not provide for the most efficient utilization of the ARP tables in such situations.

Accordingly, it would be desirable to provide an ARP table management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an Address Resolution Protocol (ARP) table management engine that is configured to: map destination addresses to next hop addresses using an ARP entry table and an ARP egress table; determine that the ARP egress table is full and, in response, map destination addresses to next hop addresses in double-entries in the ARP entry table; and determine, when the ARP egress table is full, that a second destination address is associated with a first next hop address that is mapped to a first destination address in a first double-entry in the ARP entry table and, in response: identify a third destination address in the ARP entry table that is the only destination address in the ARP entry table that is mapped to a second next hop address in the ARP egress table; remove the second next hop address from an ARP egress row in the ARP egress table and map the third destination address to the second next hop address in a second double-entry in the ARP entry table; provide the first next hop address in the ARP egress row in the ARP egress table, and provide each of the first destination address and the second destination address in respective ARP entry rows in the ARP entry table; and map each of the first destination address and the second destination address in the respective ARP entry rows in the ARP entry table to the first next hop address in the ARP egress row in the ARP egress table.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
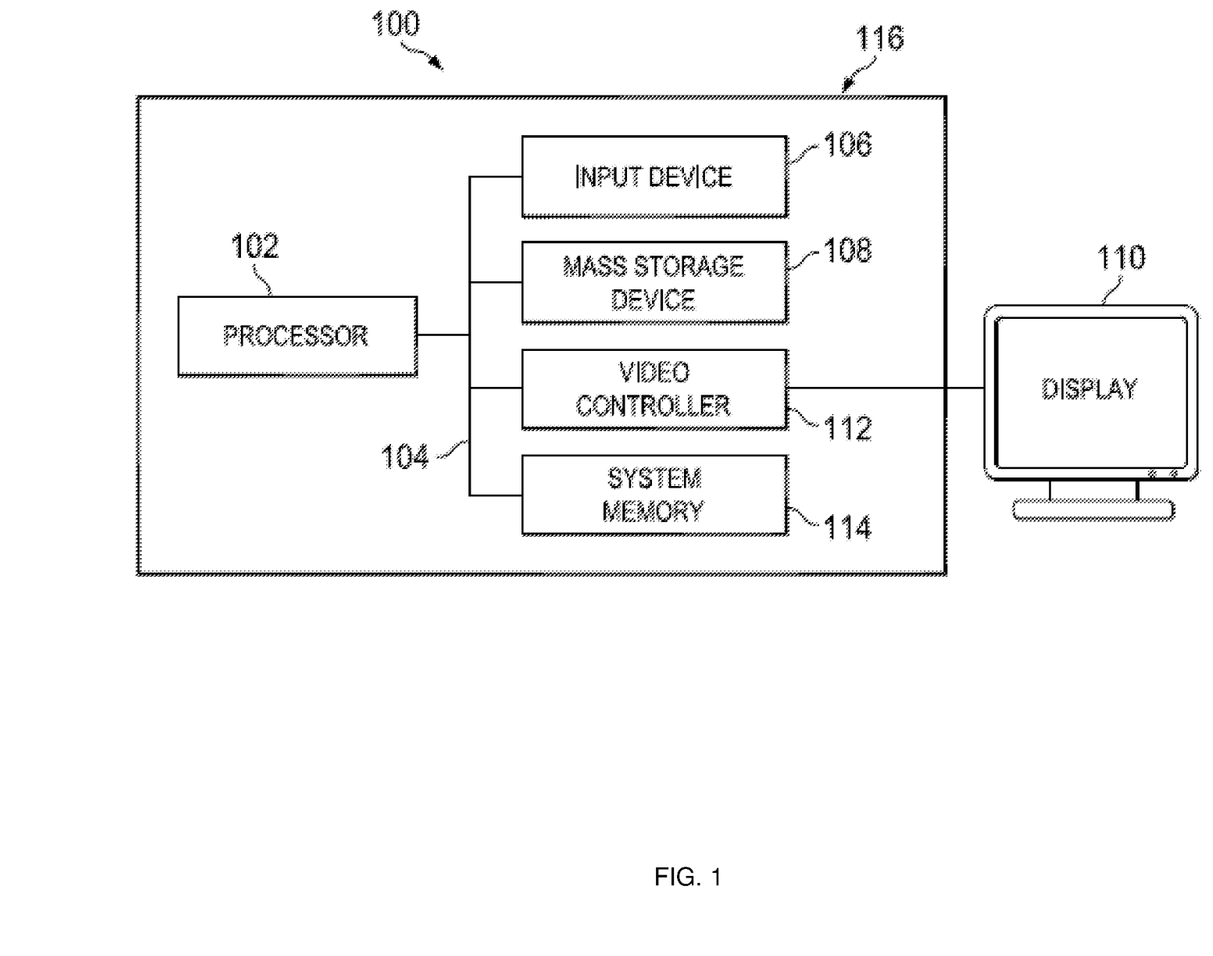
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
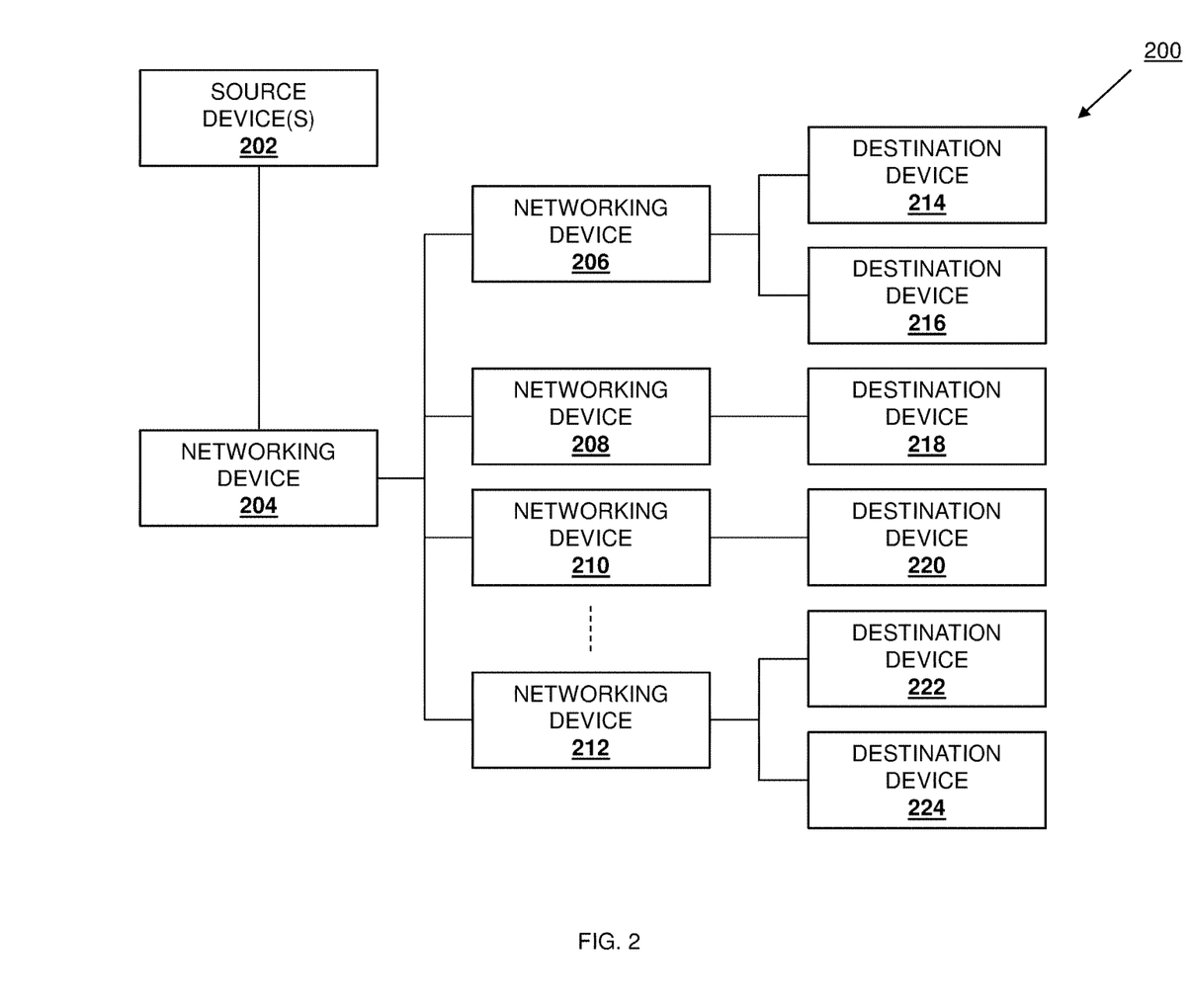
FIG. 2 is a schematic view illustrating an embodiment of an ARP table management system.

Referring now to FIG. 2, an embodiment of an Address Resolution Protocol (ARP) table management system 200 is illustrated. In the illustrated embodiment, the ARP table management system 200 includes one or more source devices 202. In an embodiment, the source device(s) 202 may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or other computing devices that would be apparent to one of skill in the art in possession of the present disclosure. However, while illustrated and discussed as being provided by particular computing devices, one of skill in the art in possession of the present disclosure will recognize that source devices provided in the ARP table management system 200 may include any devices that may be configured to operate similarly as the source device(s) 202 discussed below.

In the illustrated embodiment, the ARP table management system 200 also includes a networking device 204 that is coupled to the source device(s) 202. The networking device 204 may be provided by the IHS 100 discussed above with reference to FIG. 1, and/or may include some or all of the components of the IHS 100, and in specific examples is provided by a switch device that performs the ARP table management operations discussed below. However, while illustrated and discussed as being provided by a switch device, one of skill in the art in possession of the present disclosure will recognize that networking devices provided in the ARP table management system 200 may include any devices that may be configured to operate similarly as the networking device 204 discussed below. While the networking device 204 is illustrated as directly coupled to the source device(s) 202, one of skill in the art in possession of the present disclosure will recognize that intermediate devices (e.g., other networking devices) may be coupled between the source device(s) 202 and the networking device 204 while remaining within the scope of the present disclosure as well. Furthermore, while the networking device 204 is described as performing the ARP table management operations of the present disclosure, one of skill in the art in possession of the present disclosure will appreciate that other networking devices in the ARP table management system 200 may operate similarly while remaining within the scope of the present disclosure as well.

In the illustrated embodiment, the ARP table management system 200 also includes a plurality of networking devices 206, 208, 210, and up to 212 that are each coupled to the networking device 204. Any or all of the networking devices 206-212 may be provided by the IHS 100 discussed above with reference to FIG. 1, and/or may include some or all of the components of the IHS 100, and in specific examples are provided by "next-hop" switch devices that provide a "next hop" from the networking device 204 to their connected destination devices. However, while illustrated and discussed as being provided by switch devices, one of skill in the art in possession of the present disclosure will recognize that networking devices provided in the ARP table management system 200 may include any devices that may be configured to operate similarly as the networking devices 206-212 discussed herein. While the networking devices 206-212 are described as the "next hops" for the networking device 204 to destination devices, one of skill in the art in possession of the present disclosure will appreciate that other networking devices in the ARP table management system 200 may operate similarly while remaining within the scope of the present disclosure as well.

In the illustrated embodiment, the ARP table management system 200 also includes destination devices 214 and 216 that are coupled to the networking device 206, a destination device 218 that is coupled to the networking device 208, a destination device 220 that is coupled to the networking device 210, and destination devices 222 and 224 that are coupled to the networking device 212. Any or all of the destination devices 214-224 may be provided by the IHS 100 discussed above with reference to FIG. 1, and/or may include some or all of the components of the IHS 100, and in specific examples are provided by server devices, storage devices, and/or other computing devices that would be apparent to one of skill in the art in possession of the present disclosure. However, while illustrated and discussed as being provided by particular computing devices, one of skill in the art in possession of the present disclosure will recognize that destination devices provided in the ARP table management system 200 may include any devices that may be configured to operate similarly as the destination devices 214-224 discussed herein. While the destination devices 214-224 are illustrated as each directly coupled to one of the networking devices 206-212, one of skill in the art in possession of the present disclosure will recognize that intermediate devices (e.g., other networking devices) may be coupled between the networking devices 206-212 and the destination devices 214-224 while remaining within the scope of the present disclosure as well. Furthermore, while a specific ARP table management system 200 has been illustrated and described, one of skill in the art in possession of the present disclosure will recognize that the ARP table management system of the present disclosure may include a variety of components and component configurations while remaining within the scope of the present disclosure as well.

Figure 3:
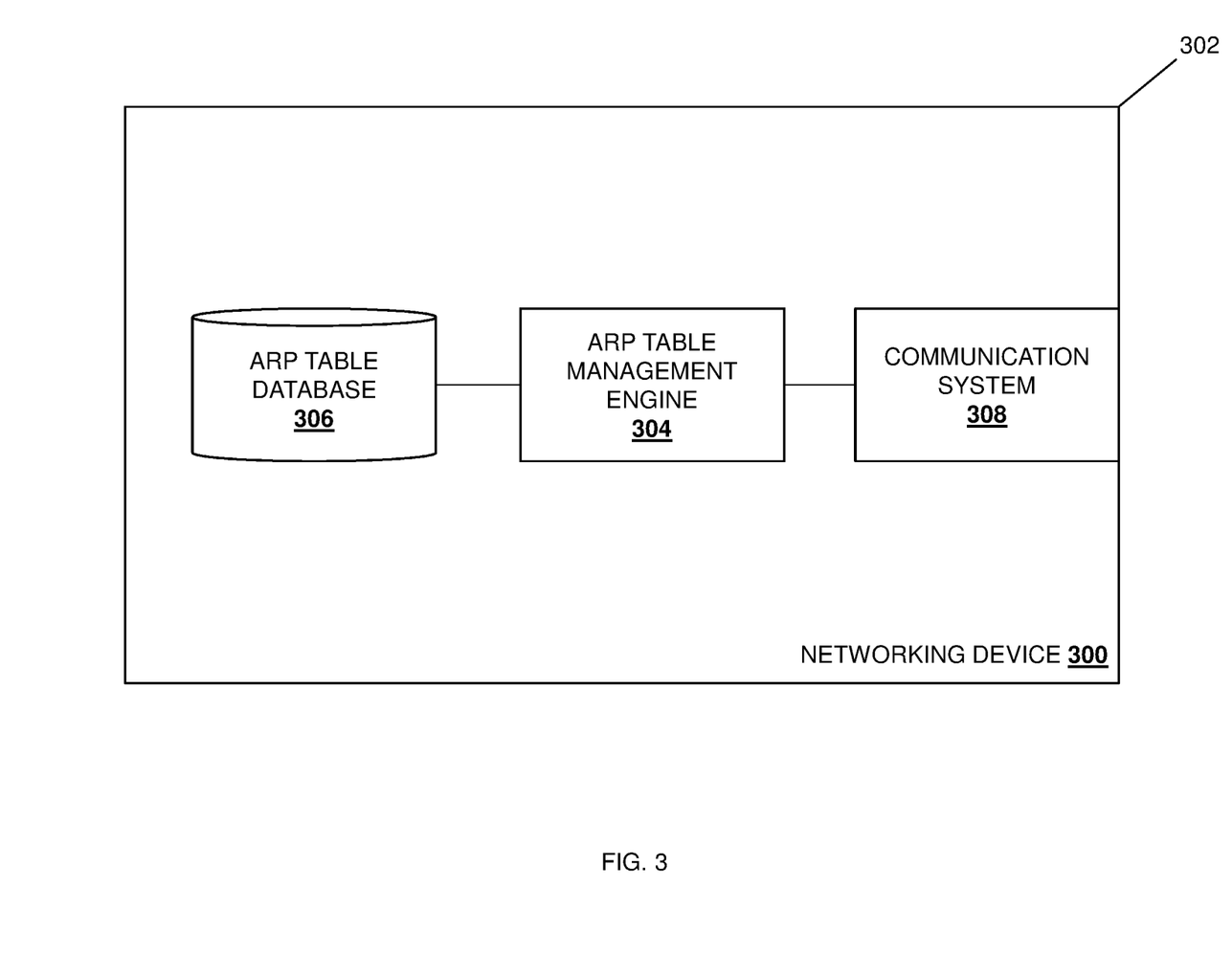
FIG. 3 is a schematic view illustrating an embodiment of a networking device that may be provided in the ARP table management system of FIG. 2.

Referring now to FIG. 3, an embodiment of a networking device 300 is illustrated that may provide the networking device 204 discussed above with reference to FIG. 2. As such, the networking device 300 may be provided by the IHS 100 discussed above with reference to FIG. 1 and/or may include some or all of the components of the IHS 100, and in specific examples is provided by a switch device that performs the ARP table management operations discussed below. Furthermore, while illustrated and discussed as a switch device, one of skill in the art in possession of the present disclosure will recognize that the functionality of the networking device 300 discussed below may be provided by other devices that are configured to operate similarly as the networking device 300 discussed below. In the illustrated embodiment, the networking device 300 includes a chassis 302 that houses the components of the networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an ARP table management engine 304 that is configured to perform the functionality of the ARP table management engines and/or networking devices discussed below.

The chassis 302 may also house a storage system (not illustrated, but which may include the storage 108 discussed above with reference to FIG. 1) that is coupled to the ARP table management engine 304 (e.g., via a coupling between the storage system and the processing system) and that includes an ARP table database 306 that is configured to store any of the information managed and/or otherwise utilized by the ARP table management engine 304 discussed below. The chassis 302 may also house a communication system 308 that is coupled to the ARP table management engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific networking device 300 has been illustrated, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4:
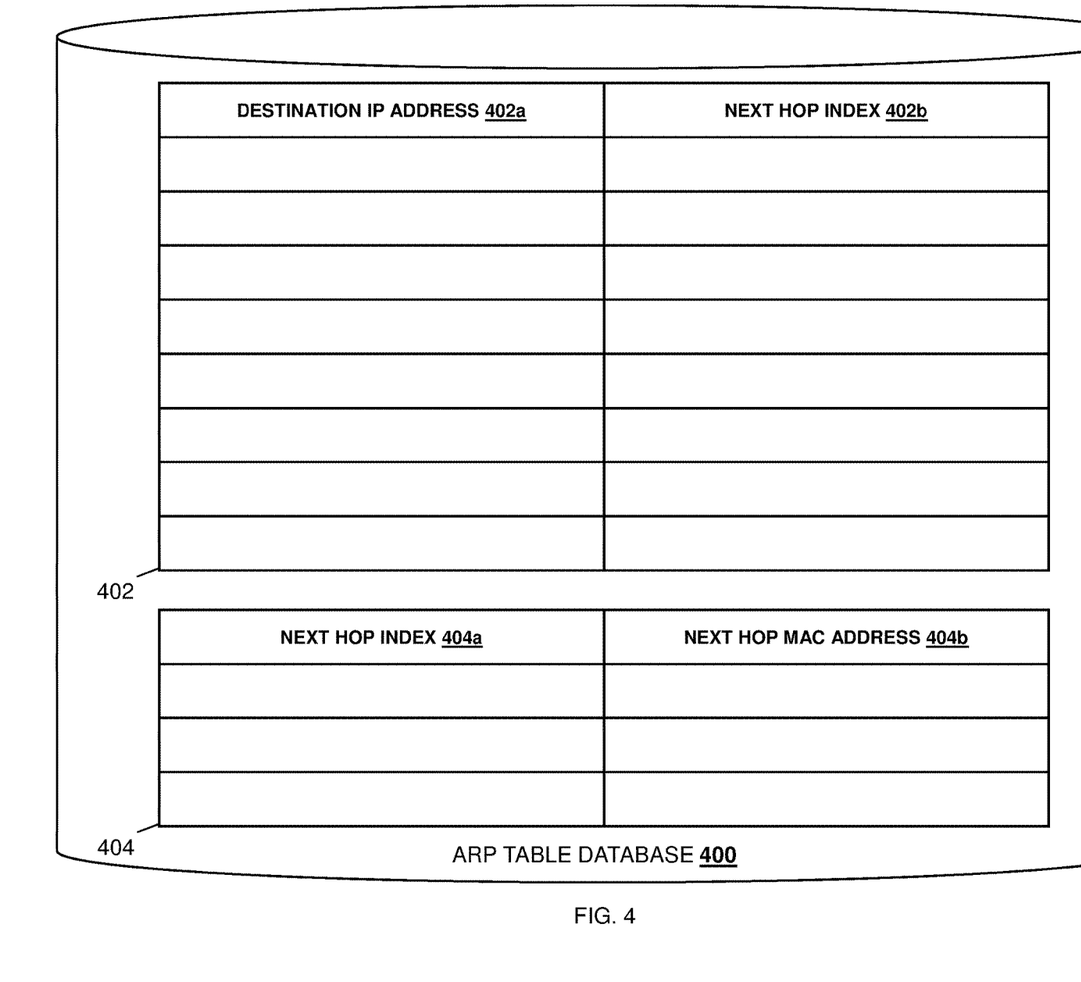
FIG. 4 is a schematic view illustrating an embodiment of an ARP table database that may be provided in the networking device of FIG. 3.

Referring now to FIG. 4, an embodiment of an ARP table database 400 is illustrated that may provide the ARP table database 306 discussed above with reference to FIG. 3. In the illustrated embodiment, the ARP table database 400 includes an ARP entry table 402 having a destination IP address column 402a and a next hop index column 402b, and an ARP egress table 404 having a next hop index column 404a and a next hop MAC address column 404b. In an embodiment, and as described in the examples below, the ARP entry table 402 may be provided by an "L3_ENTRY_IPV4_UNICAST" table, with each row in the ARP entry table 402 configured to store destination internet layer addresses provided by Internet Protocol version 4 (IPv4) addresses (in the destination IP address column 402a) in association with next hop index values (in the next hop index column 402b), and the ARP egress table 404 may be provided by an "EGR_L3_NEXT_HOP" table, with each row in the ARP egress table 404 configured to store next hop link layer addresses provided by MAC addresses (in the next hop MAC address column 404b) in association with next hop index values (in the next hop index column 404a). As discussed below, the next hop index values in the next hop index columns 402b and 404a may be utilized to provide mappings between destination IP addresses in the destination IP address column 402a with next hop MAC addresses in the next hop MAC address column 404b. However, while ARP tables mapping specific destination addresses and next hop addresses have been described, one of skill in the art in possession of the present disclosure will recognize that the teachings of the present disclosure may be applied to other destination addresses and next hop addresses while remaining within the scope of the present disclosure as well.

Figure 5:
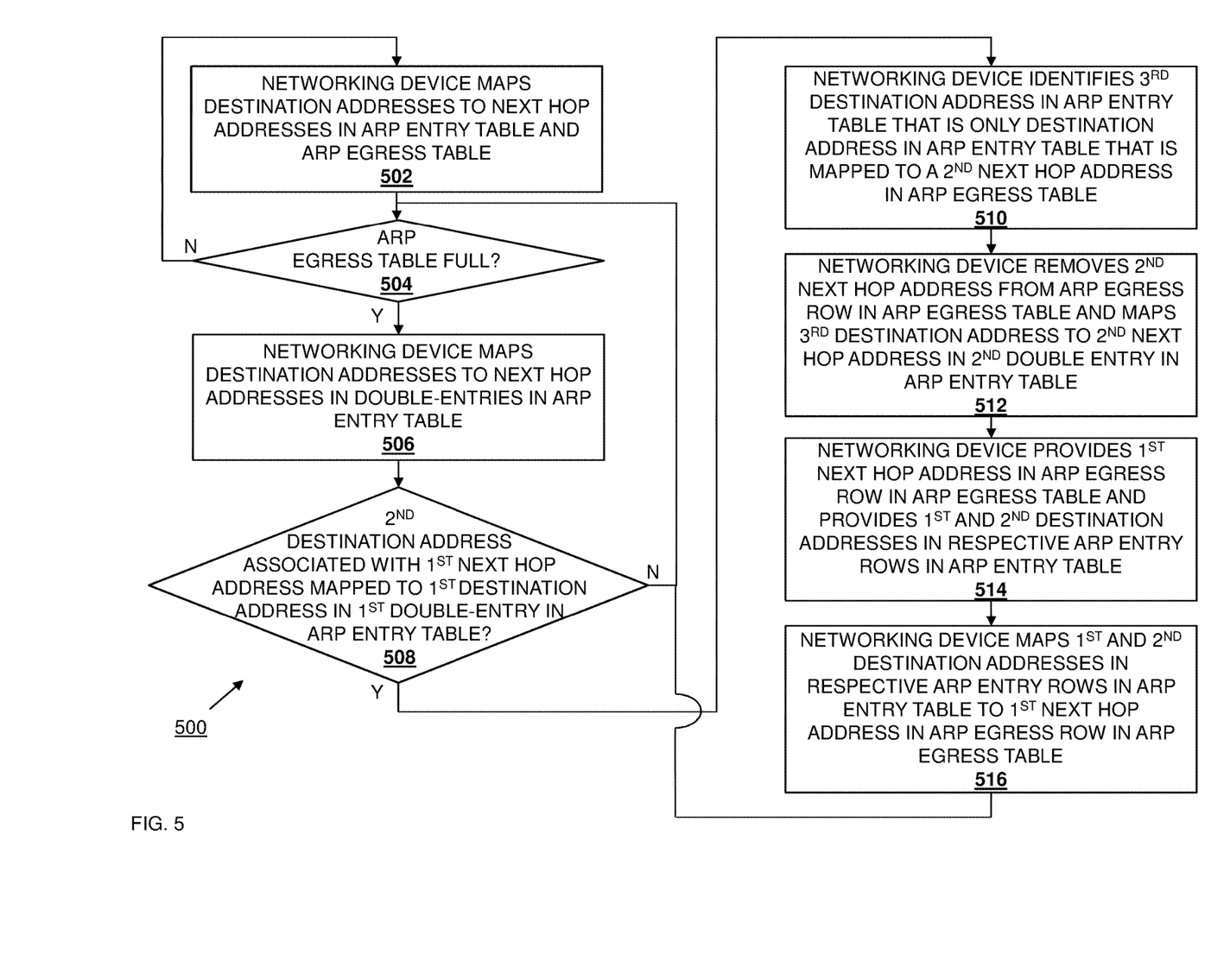
FIG. 5 is a flow chart illustrating an embodiment of a method for managing ARP tables.

Referring now to FIG. 5, an embodiment of a method 500 for managing ARP tables is illustrated. As discussed below, the systems and methods of the present disclosure provide for more efficient utilization of ARP tables via ARP table management operations that include the identification, when the an ARP egress table is full and a data packet is received, of a first destination addresses that is associated with a first next hop address that is already mapped to a second destination address in a first double-entry in an ARP entry table. In response to such an identification, the ARP table management operations performed by the systems and methods of the present disclosure include identifying a third destination address in the ARP entry table that is the only destination address in the ARP entry table that is mapped to a second next hop address in the ARP egress table, and removing the second next hop address from an ARP egress row in the ARP egress table and mapping the third destination address to the second next hop address in a second double-entry in the ARP entry table. The ARP table management operations performed by the systems and methods of the present disclosure then include providing the first next hop address in the ARP egress row in the ARP egress table, and providing each of the first destination address and the second destination address in respective ARP entry rows in the ARP entry table, and mapping each of the first destination address and the second destination address in the respective ARP entry rows in the ARP entry table to the first next hop address in the ARP egress row in the ARP egress table. As will be appreciated by one of skill in the art in possession of the present disclosure, the performance of the management operations discussed above provides for more efficient use of those ARP tables.

The method 500 begins at block 502 where a networking device maps destination addresses to next hop addresses in an ARP entry table and an ARP egress table. In an embodiment, at block 502, the source device(s) 202 may generate and transmit data packets to the destination devices 214-224 via the networking device 204 and, as such, the ARP table management engine 304 in the networking device 204/300 may receive data packets generated and transmitted by the source device(s) 202 via its communication system 308 at block 502, identify destination addresses in those data packets, identify next hop addresses for those data packets, and map the destination addresses to the next hop addresses in an ARP entry table and ARP egress table. For example, with reference to FIG. 6A, the ARP table database 400 is illustrated with entries in the ARP entry table 402 and ARP egress table 404 following the receiving of data packets from the source device(s) 202 by the networking device 204.

Figure 6A:
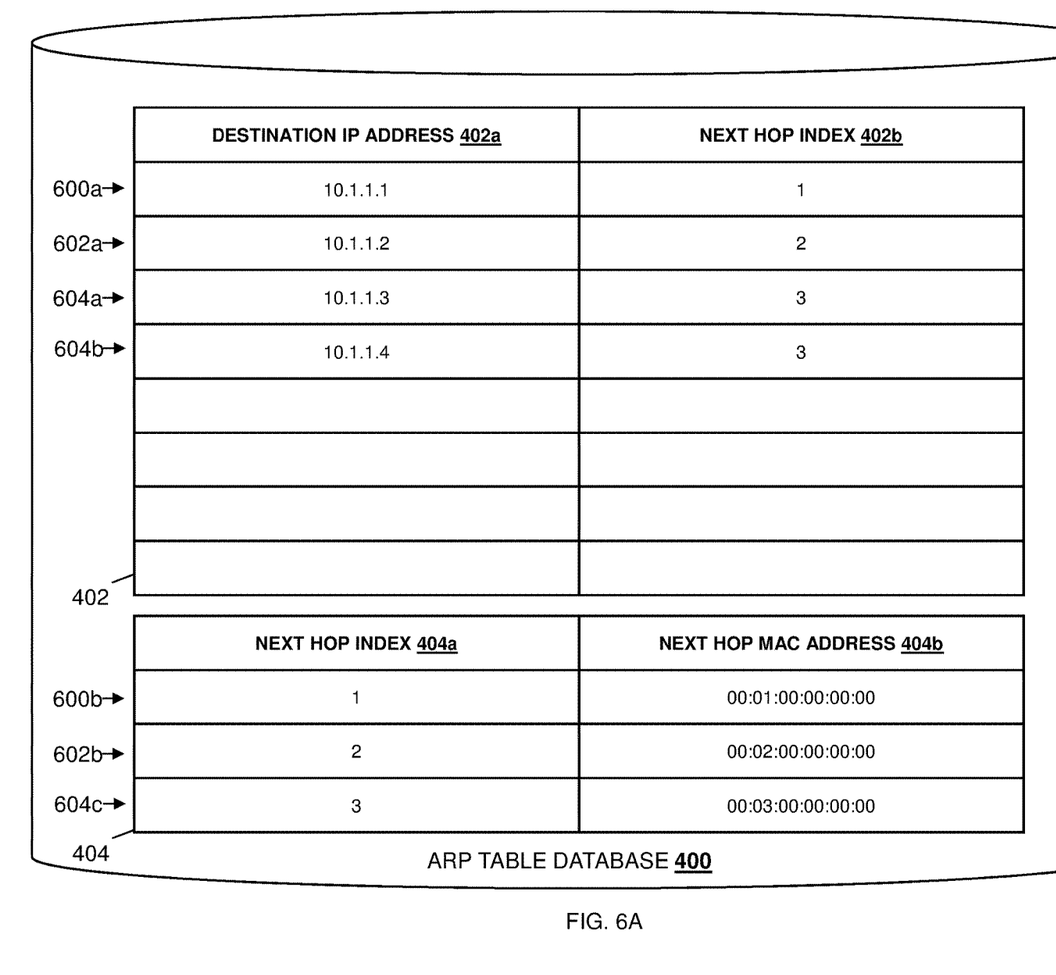
FIG. 6A is a schematic view illustrating an embodiment of the ARP table database during the method of FIG. 5.

As such, the ARP table management engine 304 in the networking device 204/300 may have received a data packet generated by a source device 202 and destined for the destination device 216, and identified an IPv4 address ("10.1.1.1") of the destination device 216 in that data packet. The ARP table management engine 304 in the networking device 204/300 may have then performed ARP operations to identify a MAC address (e.g., "00:01:00:00:00:00") of the networking device 208 that provides the next hop to the destination device 216 from the networking device 204. ARP operations to identify next hop addresses (e.g., MAC addresses) of next hop devices are known in the art and thus not discusses herein in detail. Thus, as illustrated in FIG. 6A, the ARP table management engine 304 in the networking device 204/300 has mapped the IPv4 address ("10.1.1.1") to the MAC address (e.g., "00:01:00:00:00:00") in the ARP entry table 402 and ARP egress table 404 by providing a row/entry 600a in the ARP entry table 402 that includes the IPv4 address ("10.1.1.1") in the destination IP address column 402a and a next hop index value ("1") in the next hop index column 402b, and providing a row/entry 600b in the ARP egress table 404 that includes the next hop index value ("1") in the next hop index column 404a and the MAC address (e.g., "00:01:00:00:00:00") in the next hop MAC address column 404b, with the next hop index value ("1") mapping the IPv4 address ("10.1.1.1") to the MAC address (e.g., "00:01:00:00:00:00").

Similarly, the ARP table management engine 304 in the networking device 204/300 may have received a data packet generated by a source device 202 and destined for the destination device 218, and identified an IPv4 address ("10.1.1.2") of the destination device 218 in that data packet. The ARP table management engine 304 in the networking device 204/300 may have then performed ARP operations to identify a MAC address (e.g., "00:02:00:00:00:00") of the networking device 210 that provides the next hop to the destination device 218 from the networking device 204. ARP operations to identify next hop addresses (e.g., MAC addresses) of next hop devices are known in the art and thus not discusses herein in detail. Thus, as illustrated in FIG. 6A, the ARP table management engine 304 in the networking device 204/300 has mapped the IPv4 address ("10.1.1.2") to the MAC address (e.g., "00:02:00:00:00:00") in the ARP entry table 402 and ARP egress table 404 by providing a row/entry 602a in the ARP entry table 402 that includes the IPv4 address ("10.1.1.2") in the destination IP address column 402a and a next hop index value ("2") in the next hop index column 402b, and providing a row/entry 602b in the ARP egress table 404 that includes the next hop index value ("2") in the next hop index column 404a and the MAC address (e.g., "00:02:00:00:00:00") in the next hop MAC address column 404b, with the next hop index value ("2") mapping the IPv4 address ("10.1.1.2") to the MAC address (e.g., "00:02:00:00:00:00").

Similarly, the ARP table management engine 304 in the networking device 204/300 may have received data packets generated by a source device 202 and destined for the respective destination devices 214 and 216, and identified respective IPv4 addresses ("10.1.1.3" and "10.1.1.4") of the respective destination devices 214 and 216 in those data packets. The ARP table management engine 304 in the networking device 204/300 may have then performed ARP operations to identify a MAC address (e.g., "00:03:00:00:00:00") of the networking device 206 that provides the next hop to the destination devices 214 and 216 from the networking device 204. ARP operations to identify next hop addresses (e.g., MAC addresses) of next hop devices are known in the art and thus not discusses herein in detail. Thus, as illustrated in FIG. 6A, the ARP table management engine 304 in the networking device 204/300 has mapped the IPv4 addresses ("10.1.1.3" and "10.1.1.4") to the MAC address (e.g., "00:03:00:00:00:00") in the ARP entry table 402 and ARP egress table 404 by providing a row/entry 604a in the ARP entry table 402 that includes the IPv4 address ("10.1.1.3") in the destination IP address column 402a and a next hop index value ("3") in the next hop index column 402b, providing a row/entry 604b in the ARP entry table 402 that includes the IPv4 address ("10.1.1.4") in the destination IP address column 402a and the next hop index value ("3") in the next hop index column 402b, and providing a row/entry 604c in the ARP egress table 404 that includes the next hop index value ("3") in the next hop index column 404a and the MAC address (e.g., "00:03:00:00:00:00") in the next hop MAC address column 404b, with the next hop index value ("3") mapping the IPv4 addresses ("10.1.1.3" and "10.1.1.4") to the MAC address (e.g., "00:03:00:00:00:00"). However, while specific examples have been provided, one of skill in the art in possession of the present disclosure will recognize that destination addresses may be mapped to next hop addresses in ARP tables in a variety of manners that will fall within the scope of the present disclosure as well.

The method 500 then proceeds to decision block 504 where it is determined whether the ARP egress table is full. In an embodiment, at decision block 504, the ARP table management engine 304 in the networking device 204/300 may operate to determine whether the ARP egress table 404 has filled up. As will be appreciated by one of skill in the art in possession of the present disclosure, ARP egress tables are typically smaller than ARP entry tables (i.e., include fewer rows/entries for storing the next hop value/next hop MAC address pairs illustrated in the ARP egress table 404 as compared to the number of rows/entries for storing the destination IP address/next hop value pairs illustrated in the ARP entry table 402), and thus may fill up with rows/entries before the ARP entry table. In some of the examples below, the ARP egress table 404 is discussed as capable of storing 50,000 rows/entries, while the ARP entry table 402 is discussed as capable of storing 150,000 rows/entries, although one of skill in the art in possession of the present disclosure will recognize that a variety of different sized ARP entry tables and ARP egress tables will fall within the scope of the present disclosure as well. As such, at block 504, the ARP table management engine 304 in the networking device 204/300 may determine whether all of the available rows/entries in the ARP egress table 404 have been utilized to store next hop value/next hop MAC address pairs. If, at decision block 504, it is determined that the ARP egress table is not full, the method 500 returns to block 502. As such, the method 500 may operate to map destination addresses to next hop addresses in an ARP entry table 402 and an ARP egress table 404 until the ARP egress table 404 is full.

If at decision block 504, it is determined that the ARP egress table is full, the method 500 proceeds to block 506 where the networking device maps destination addresses to next hop addresses in double-entries in the ARP entry table. In an embodiment, at block 506 and subsequent to the ARP egress table 404 filling up, the source device(s) 202 may generate and transmit data packets to the destination devices 214-224 via the networking device 204 and, as such, the ARP table management engine 304 in the networking device 204/300 may receive data packets generated and transmitted by the source device(s) 202 via its communication system 308 at block 506, identify destination addresses in those data packets, identify next hop addresses for those data packets, and map the destination addresses to the next hop addresses in double-entries in the ARP entry table 402. For example, with reference to FIG. 6B, the ARP table database 400 is illustrated with double-entries in the ARP entry table 402 following the receiving of data packets from the source device(s) 202 by the networking device 204.

Figure 6B:
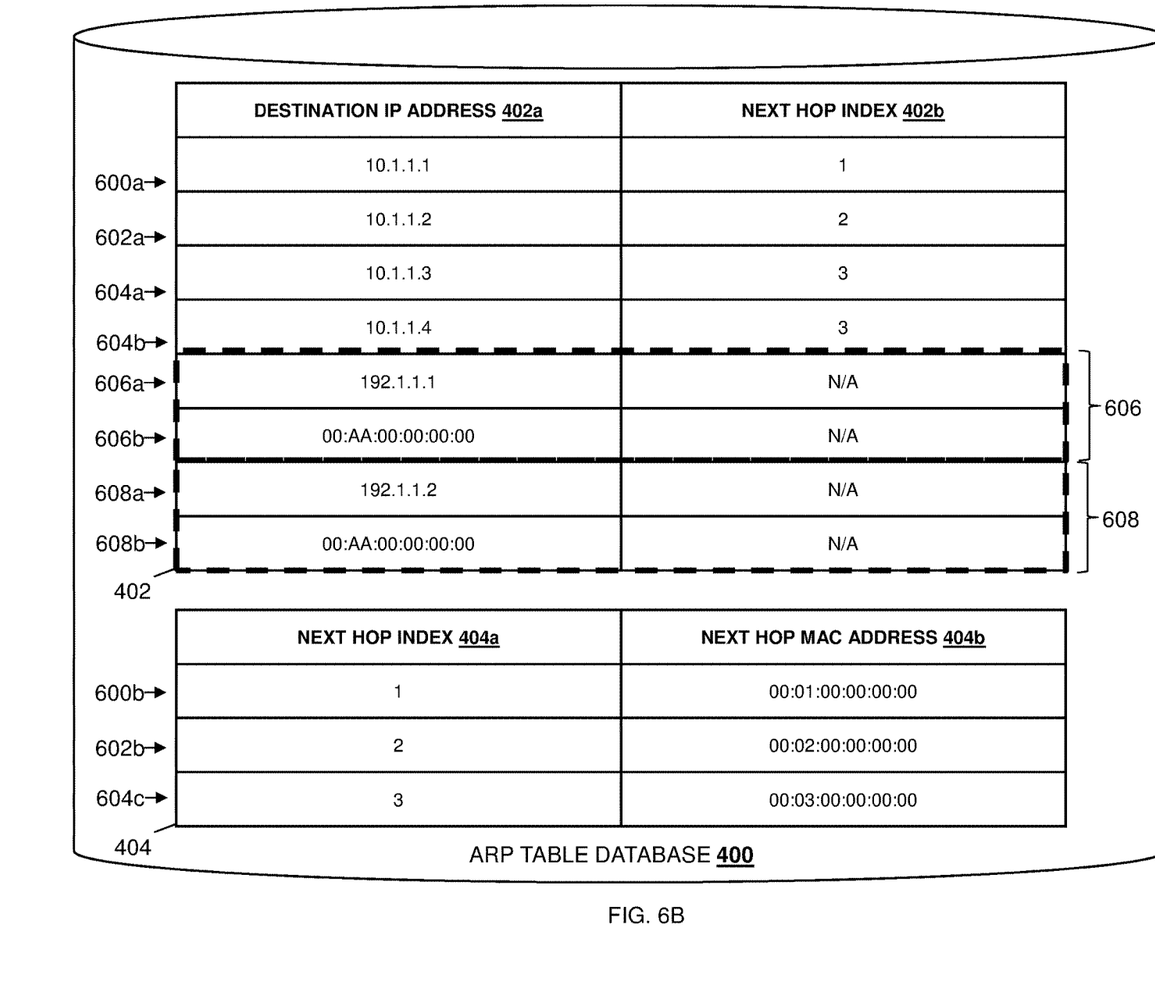
FIG. 6B is a schematic view illustrating an embodiment of the ARP table database during the method of FIG. 5.

As such, the ARP table management engine 304 in the networking device 204/300 may have received a data packet generated by a source device 202 and destined for the destination device 222, and identified an IPv4 address ("192.1.1.1") of the destination device 222 in that data packet. The ARP table management engine 304 in the networking device 204/300 may have then performed ARP operations to identify a MAC address (e.g., "00:AA:00:00:00:00") of the networking device 212 that provides the next hop to the destination device 222 from the networking device 204. ARP operations to identify next hop addresses (e.g., MAC addresses) of next hop devices are known in the art and thus not discusses herein in detail. Thus, as illustrated in FIG. 6B, the ARP table management engine 304 in the networking device 204/300 has mapped the IPv4 address ("192.1.1.1") to the MAC address (e.g., "00:AA:00:00:00:00") in a double-entry 606 in the ARP entry table 402 by providing a row/entry 606a in the ARP entry table 402 that includes the IPv4 address ("192.1.1.1") in the destination IP address column 402a and no value (e.g., "N/A") the next hop index column 402b, and providing a row/entry 606b in the ARP entry table 402 that includes the MAC address (e.g., "00:AA:00:00:00:00") in the destination IP address column 402a and no value (e.g., "N/A") the next hop index column 402b.

Similarly, the ARP table management engine 304 in the networking device 204/300 may have received a data packet generated by a source device 202 and destined for the destination device 224, and identified an IPv4 address ("192.1.1.2") of the destination device 224 in that data packet. The ARP table management engine 304 in the networking device 204/300 may have then performed ARP operations to identify the MAC address (e.g., "00:AA:00:00:00:00") of the networking device 212 that provides the next hop to the destination device 224 from the networking device 204. ARP operations to identify next hop addresses (e.g., MAC addresses) of next hop devices are known in the art and thus not discusses herein in detail. Thus, as illustrated in FIG. 6B, the ARP table management engine 304 in the networking device 204/300 has mapped the IPv4 address ("192.1.1.2") to the MAC address (e.g., "00:AA:00:00:00:00") in a double-entry 608 in the ARP entry table 402 by providing a row/entry 608a in the ARP entry table 402 that includes the IPv4 address ("192.1.1.2") in the destination IP address column 402a and no value (e.g., "N/A") the next hop index column 402b, and providing a row/entry 608b in the ARP entry table 402 that includes the MAC address (e.g., "00:AA:00:00:00:00") in the destination IP address column 402a and no value (e.g., "N/A") the next hop index column 402b.

As will be appreciated by one of skill in the art in possession of the present disclosure, the mapping of destination addresses to next hop addresses in double-entries in the ARP entry table 402 may be performed for at least as long as the ARP entry table 404 is full and there are rows/entries available in the ARP entry table 402. Furthermore, in conventional ARP table management systems, the mapping of each destination address to each next hop address in double-entries in the ARP entry table will occur even in situations like that illustrated in FIG. 6B where multiple double-entries map different IPv4 addresses to the same MAC address (e.g., as in the double-entries 606 and 608 that map the IPv4 addresses ("192.1.1.1" and "192.1.1.2") to the MAC address ("00:AA:00:00:00:00")) The inventors of the present disclosure have recognized that such conventional ARP table management systems limit the maximum number of destination address/next hop address mappings according to the following equation:

$$[\text{ARP egress table size}] + ([\text{ARP entry table size}] - [\text{ARP egress table size}])/2$$

Thus, using an example in which the ARP entry table 402 is capable of storing 150,000 rows/entries and the ARP egress table 404 is capable of storing 50,000 rows/entries, the maximum number of destination address/next hop address mappings available in such a system would be:

$$50{,}000 + (150{,}000 - 50{,}000)/2 = 100{,}000$$

As discussed below, the method 500 provides for management of the APR entry table 402 and ARP egress table 404 in a manner that increases the maximum number of destination address/next hop address mappings available when multiple double-entries map (or would map) different IPv4 addresses to the same MAC address.

The method 500 then proceeds to decision block 508 where it is determined whether a second destination address is associated with a first next hop address that is mapped to a first destination address in a first double-entry in the ARP entry table. In an embodiment, at decision block 508, the ARP table management engine 304 in the networking device 204/300 may determine when a destination address received in a data packet is associated with a next hop address that is mapped to another destination address in a double-entry in the ARP entry table 402. For example, in some embodiments, the ARP table management engine 304 in the networking device 204/300 may operate as discussed above with reference to block 506 to perform the double-entry mapping in the ARP entry table 402, and at decision block 508 may determine whether the most recent double-entry provided in the ARP entry table 402 maps a destination address to a next hop address that is also mapped to another destination address in another double-entry provided in the ARP entry table 402.

In another example, in some embodiments, the ARP table management engine 304 in the networking device 204/300 may operate during the performance of the double-entry mapping in the ARP entry table 402 to determine whether a destination address received in a data packet is to-be mapped to a next hop address that is already mapped to another destination address in a double-entry provided in the ARP entry table 402. In yet another example, the ARP table management engine 304 in the networking device 204/300 may periodically analyze the ARP entry table 402 to determine whether double-entry mapping operations have resulted in at least two double-entries that map respective destination addresses to the same next hop address. However, while a few particular examples have been described, one of skill in the art in possession of the present disclosure will appreciate that the determination of whether a second destination address is associated with a first next hop address that is mapped to a first destination address in a first double-entry in the ARP entry table may be performed in a variety of manners that will fall within the scope of the present disclosure as well.

If, at decision block 508, it is determined that the second destination address is not associated with a first next hop address that is mapped to a first destination address in a double-entry in the ARP entry table, the method 500 returns to decision block 504. As such, in some embodiments, the method 500 may operate to perform the double-entry mapping discussed above as long as the ARP egress table is full and there 1) are no double-entries in the ARP entry table 402 that map respective destination addresses to the same next hop address, and/or 2) no destination address is received in a data packet that is to-be mapped to a next hop address that is already mapped to another destination address in a double-entry in the ARP entry table 402.

If at decision block 508, it is determined that the second destination address is associated with a first next hop address that is mapped to a first destination address in a double-entry in the ARP entry table, the method 500 proceeds to block 510 where the networking device identifies a third destination address in the ARP entry table that is the only destination address in the ARP entry table that is mapped to a second next hop address in the ARP egress table. With reference to FIG. 6B, in some embodiments the ARP table management engine 304 in the networking device 204/300 may have determined at decision block 508 that the IPv4 address ("192.1.1.2") in the double entry 608 in the ARP entry table 402 is mapped to the MAC address ("00:AA: 00:00:00:00") that is also mapped to the IPv4 address ("192.1.1.1") in the double-entry 606 in the ARP entry table 402 and, in response, may operate according to block 510. However, in other embodiments, rather than having provided the double-entry 608 illustrated in FIG. 6B, the ARP table management engine 304 in the networking device 204/300 may have received the IPv4 address ("192.1.1.2") and determined that it should be mapped in a double-entry in the ARP entry table 402 to the MAC address ("00:AA: 00:00:00:00") that is also mapped to the IPv4 address ("192.1.1.1") in the double-entry 606 in the ARP entry table 402 and, in response, may proceed to block 510.

In an embodiment, at block 504, the ARP table management engine 304 in the networking device 204/300 may operate to identify the IPv4 address ("10.1.1.1") in the row/entry 600a of the ARP entry table 402 as the only destination address in the ARP entry table 402 that is mapped to the MAC address ("00:01:00:00:00:00") (i.e., in the row/entry 600b of the ARP egress table 404.) In a specific example, the identification of the IPv4 address ("10.1.1.1") in the row/entry 600a of the ARP entry table 402 as the only destination address in the ARP entry table 402 that is mapped to the MAC address ("00:01:00:00:00: 00") may include identifying that the next hop index value "1" is associated with only 1) the IPv4 address ("10.1.1.1") in the row/entry 600a of the ARP entry table 402, and 2) the MAC address ("00:01:00:00:00:00") i.e., in the row/entry 600b of the ARP egress table 404 (i.e., the next hop index value "1" is only associated with single entries in each of the ARP entry table 402 and ARP egress table 404.) However, while a particular destination/IPv4 address is identified using particular techniques in the example provided herein, one of skill in the art in possession of the present disclosure will recognize that there may be multiple destination addresses in an ARP entry table that are the only destination addresses mapped to respective next hop addresses in an ARP entry table (e.g., the IPv4 address ("10.1.1.2") in the row/entry 602a of the ARP entry table 402 is the only destination address in the ARP entry table 402 that is mapped to the MAC address ("00:02:00:00:00:00") (i.e., in the row/entry 602b of the ARP egress table 404)), and the identification of any of those destination addresses using any of a variety of techniques will fall within the scope of the present disclosure as well. Furthermore, one of skill in the art in possession of the present disclosure will appreciated that identification of a particular destination address that is the only destination address in an ARP entry table that is mapped to a particular next hop address in an ARP egress table may be made based on a variety of considerations (e.g., other than the next hop index value as discussed above), any of which will fall within the scope of the present disclosure.

Figure 6C:
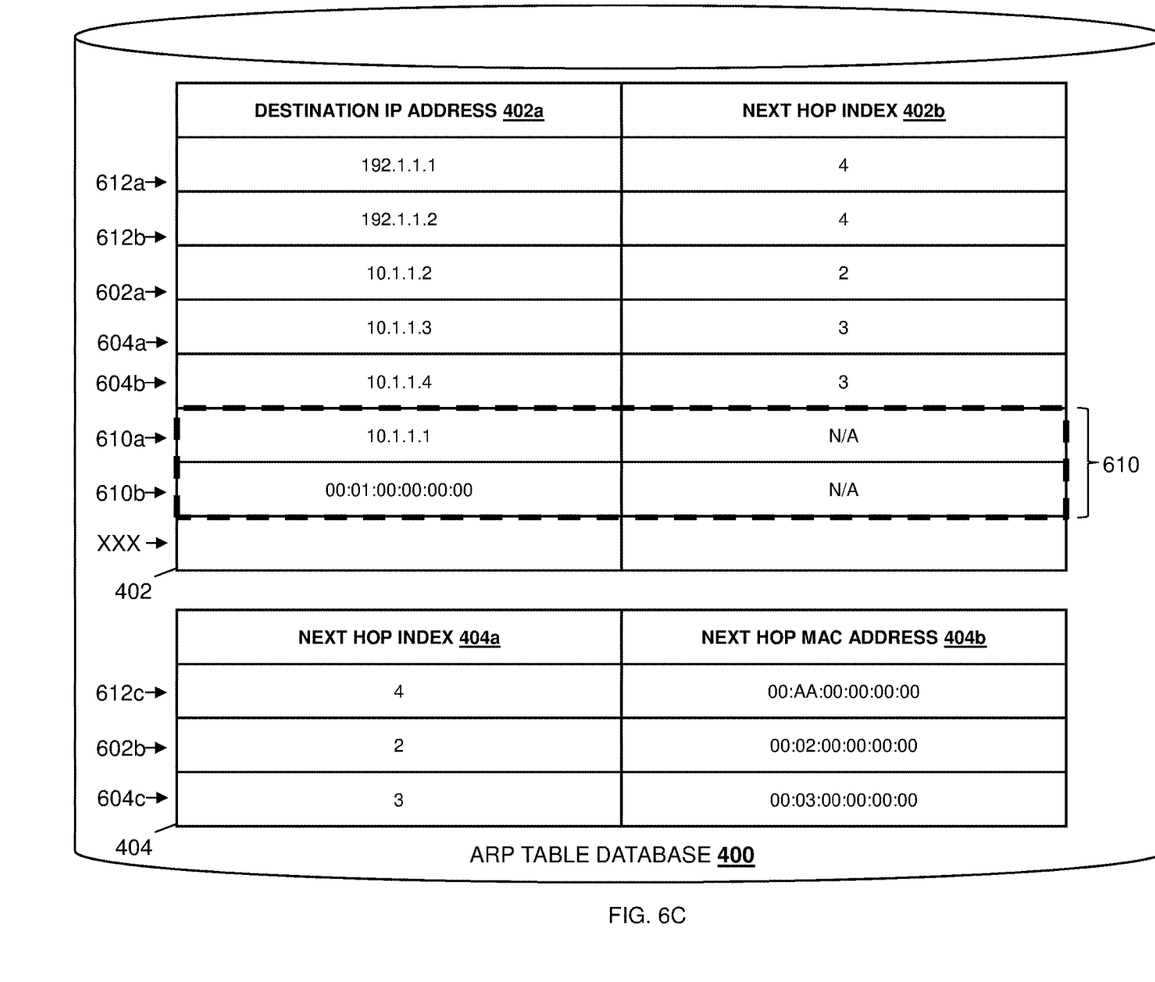
FIG. 6C is a schematic view illustrating an embodiment of the ARP table database during the method of FIG. 5.

The method 500 then proceeds to block 512 where the networking device removes the second next hop address from an ARP egress row in the ARP egress table and maps the third destination address to the second next hop address in a second double-entry in the ARP entry table. With reference to FIGS. 6B and 6C, in an embodiment of block 512, the ARP table management engine 304 in the networking device 204/300 may operate to remove the IPv4 address ("10.1.1.1") and the next hop value ("1") from the row/entry 600a of the ARP entry table 402, remove the next hop value ("1") and the MAC address ("00:01:00:00:00:00") from the row/entry 600b of the ARP egress table 404, and map the IPv4 address ("10.1.1.1") to the MAC address (e.g., "00: 01:00:00:00:00") in a double-entry 610 in the ARP entry table 402 by providing a row/entry 610a in the ARP entry table 402 that includes the IPv4 address ("10.1.1.1") in the destination IP address column 402a and no value (e.g., "N/A") the next hop index column 402b, and providing a row/entry 610b in the ARP entry table 402 that includes the MAC address (e.g., "00:01:00:00:00:00") in the destination IP address column 402a and no value (e.g., "N/A") the next hop index column 402b.

The method 500 then proceeds to block 514 where the networking device provides the first next hop address in the ARP egress row in the ARP egress table and provides the first and second destination addresses in respective ARP entry rows in the ARP entry table. With reference to FIGS. 6B and 6C, in an embodiment of block 514, the ARP table management engine 304 in the networking device 204/300 may operate to remove the IPv4 address ("192.1.1.1") from the row/entry 606a in the double entry 606 of the ARP entry table 402, remove the IPv4 address ("192.1.2") from the row/entry 608a in the double entry 608 of the ARP entry table 402, remove the MAC addresses ("00:AA:00:00:00:00") from the row/entry 606b in the double entry 606 of the ARP entry table 402, and remove the MAC address ("00:AA:00:00:00:00") from the row/entry 608b in the double entry 608 of the ARP entry table 402. The ARP table management engine 304 in the networking device 204/300 may then provide a row/entry 612a in the ARP entry table 402 that includes the IPv4 address ("192.1.1.1") in the destination IP address column 402a, provide a row/entry 612b in the ARP entry table 402 that includes the IPv4 address ("192.1.1.2") in the destination IP address column 402a, and provide a row/entry 612c in the ARP egress table 404 that includes the MAC address (e.g., "00:AA:00:00:00:00") in the next hop MAC address column 404b.

The method 500 then proceeds to block 516 where the networking device maps the first and second destination addresses in the respective ARP entry rows in the ARP entry table to the first next hop address in the ARP egress row in the ARP egress table. In an embodiment, at block 516, the ARP table management engine 304 in the networking device 204/300 may map the IPv4 addresses ("192.1.1.1" and "192.1.1.2") to the MAC address (e.g., "00:AA:00:00:00:00") in the ARP entry table 402 and ARP egress table 404 by providing a next hop index value ("4") in the next hop index column 402b, providing the next hop index value ("4") in the next hop index column 402b, and providing the next hop index value ("4") in the next hop index column 404a, with the next hop index value ("4") mapping the IPv4 addresses ("192.1.1.1" and "192.1.1.2") to the MAC address (e.g., "00:AA:00:00:00:00"). As will be appreciated by one of skill in the art in possession of the present disclosure, while blocks 512, 514 and 516 are illustrated and described as being performed sequentially, in some embodiments the operations performed according to those blocks may be performed simultaneously, at substantially the same time, or during the same time period in order to free up space in the ARP entry table 402 and ARP egress table 404 to allow for the movement of the address/next hop value pairs as discussed above. Furthermore, while only two IPv4 addresses ("192.1.1.1" and "192.1.1.2") are described as being mapped to the MAC address (e.g., "00:AA:00:00:00:00") in the example above, one of skill in the art in possession of the present disclosure will appreciate that the same techniques may be subsequently utilized to map any destination IPv4 address that is provided in a double entry with the MAC address (e.g., "00:AA:00:00:00:00") in the ARP entry table 402 to that MAC address (e.g., "00:AA:00:00:00:00") in the ARP egress table 404 via the next hop index value "4".

The method 500 then returns to decision block 504. As such, the method 500 may operate, when a first destination address is identified that is associated with a first next hop address that is already mapped to a second destination address in a double-entry in the ARP entry table, to identify a third destination address in the ARP entry table that is the only destination address in the ARP entry table that is mapped to a second next hop address in the ARP egress table, convert that third destination address/second next hop address pair into a double-entry in the ARP entry table, and map the first and second destination addresses to the first next hop address in the ARP entry table and ARP egress table. The inventors of the present disclosure have determined that the ARP table management system of the present disclosure provides a maximum number of destination address/next hop address mappings according to the following equation:

$$([\text{ARP egress table size}]+X)+([\text{ARP entry table size}]-([\text{ARP egress table size}]+X))/2$$

Where X is the number of double-entry destination addresses mapped (or to-be mapped) to the same next hop address. Thus, using the example in which the ARP entry table 402 is capable of storing 150,000 rows/entries and the ARP egress table 404 is capable of storing 50,000 rows/entries, the maximum number of destination address/next hop address mappings available in the system of the present disclosure (i.e., in a situation where each destination address received after the ARP egress table is full is to-be mapped to the same next hop address) would be:

$$(50,000+50,000)+(150,000-(50,000+50,000))/2=125,000$$

As such, in some embodiments, up to a 25% increase in destination/next hop mappings may be realized.

Thus, systems and methods have been described that provide for more efficient utilization of ARP tables via ARP table management operations that include the identification, when the an ARP egress table is full and a data packet is received, of a first destination addresses that is associated with a first next hop address that is already mapped to a second destination address in a first double-entry in an ARP entry table. In response to such an identification, the ARP table management operations performed by the systems and methods of the present disclosure include identifying a third destination address in the ARP entry table that is the only destination address in the ARP entry table that is mapped to a second next hop address in the ARP egress table, and removing the second next hop address from an ARP egress row in the ARP egress table and mapping the third destination address to the second next hop address in a second double-entry in the ARP entry table. The ARP table management operations performed by the systems and methods of the present disclosure then include providing the first next hop address in the ARP egress row in the ARP egress table, and providing each of the first destination address and the second destination address in respective ARP entry rows in the ARP entry table, and mapping each of the first destination address and the second destination address in the respective ARP entry rows in the ARP entry table to the first next hop address in the ARP egress row in the ARP egress table. As will be appreciated by one of skill in the art in possession of the present disclosure, the performance of the management operations discussed above opens up space in the ARP tables and provides for more efficient use of those ARP tables.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Address Resolution Protocol (ARP) table management system, comprising:
 a plurality of second networking devices that are each associated with respective next hop addresses; and
 a first networking device that is coupled to the plurality of second networking device, wherein the first networking device is configured to:
  map destination addresses to the next hop addresses using an Address Resolution Protocol (ARP) entry table and an ARP egress table;

determine that the ARP egress table is full and, in response, map destination addresses to the next hop addresses in double-entries in the ARP entry table; and determine, when the ARP egress table is full, that a second destination address is associated with a first next hop address that is mapped to a first destination address in a first double-entry in the ARP entry table and, in response:

identify a third destination address in the ARP entry table that is the only destination address in the ARP entry table that is mapped to a second next hop address in the ARP egress table;

remove the second next hop address from an ARP egress row in the ARP egress table and map the third destination address to the second next hop address in a second double-entry in the ARP entry table;

provide the first next hop address in the ARP egress row in the ARP egress table, and provide each of the first destination address and the second destination address in respective ARP entry rows in the ARP entry table; and map each of the first destination address and the second destination address in the respective ARP entry rows in the ARP entry table to the first next hop address in the ARP egress row in the ARP egress table.

2. The system of claim 1, wherein the first networking device is configured to:

receive a data packet generated by a source device;
identify the third destination address in the data packet; and perform ARP operations to determine that the third destination address is associated with the second next hop address and, in response, map the third destination address to the second next hop address by:

providing the third destination address in the ARP entry table in association with a next hop index value; and providing the second next hop address in the ARP egress table in association with the next hop index value.

3. The system of claim 1, wherein the first networking device is configured, while the ARP egress table is full, to:

receive a data packet generated by a source device;
identify the first destination address in the data packet; and perform ARP operations to determine that the first destination address is associated with the first next hop address and, in response, map the first destination address to the first next hop address by:

providing the first destination address and the first next hop address in the first double-entry in the ARP entry table.

4. The system of claim 1, wherein the first networking device is configured to determine that the second destination address is associated with the first next hop address prior to providing the second destination address in the ARP entry table by:

performing ARP operations to determine that the second destination address is associated with the first next hop address.

5. The system of claim 1, wherein the first networking device is configured to determine that the second destination address is associated with the first next hop address subsequent to providing the second destination address in the ARP entry table by:

providing the second destination address and the first next hop address in the second double-entry in the ARP entry table; and analyzing the first double-entry and the second double-entry to determine that each of the first destination address and the second destination address are associated with the same first next hop address.

6. The system of claim 1, wherein the destination addresses are Internet Protocol version 4 (IPv4) addresses, and the next hop addresses are Media Access Control (MAC) addresses.

7. An Information Handling System (IHS), comprising:
a processing system; and
a memory system that is coupled to the processing system and that includes instructions that, when executed by the processing system, cause the processing system to provide an Address Resolution Protocol (ARP) table management engine that is configured to:

map destination addresses to next hop addresses using an ARP entry table and an ARP egress table;

determine that the ARP egress table is full and, in response, map destination addresses to next hop addresses in double-entries in the ARP entry table; and determine, when the ARP egress table is full, that a second destination address is associated with a first next hop address that is mapped to a first destination address in a first double-entry in the ARP entry table and, in response:

identify a third destination address in the ARP entry table that is the only destination address in the ARP entry table that is mapped to a second next hop address in the ARP egress table;

remove the second next hop address from an ARP egress row in the ARP egress table and map the third destination address to the second next hop address in a second double-entry in the ARP entry table;

provide the first next hop address in the ARP egress row in the ARP egress table, and provide each of the first destination address and the second destination address in respective ARP entry rows in the ARP entry table; and map each of the first destination address and the second destination address in the respective ARP entry rows in the ARP entry table to the first next hop address in the ARP egress row in the ARP egress table.

8. The IHS of claim 7, wherein the ARP table management engine is configured to:

receive a data packet generated by a source device;
identify the third destination address in the data packet; and perform ARP operations to determine that the third destination address is associated with the second next hop address and, in response, map the third destination address to the second next hop address by:

providing the third destination address in the ARP entry table in association with a next hop index value; and providing the second next hop address in the ARP egress table in association with the next hope index value.

9. The IHS of claim 7, wherein the ARP table management engine is configured, while the ARP egress table is full, to:

receive a data packet generated by a source device;

identify the first destination address in the data packet; and perform ARP operations to determine that the first destination address is associated with the first next hop address and, in response, map the first destination address to the first next hop address by:

providing the first destination address and the first next hop address in the first double-entry in the ARP entry table.

10. The IHS of claim 7, wherein the ARP table management engine is configured to determine that the second destination address is associated with the first next hop address prior to providing the second destination address in the ARP entry table by:

performing ARP operations to determine that the second destination address is associated with the first next hop address.

11. The IHS of claim 7, wherein the ARP table management engine is configured to determine that the second destination address is associated with the first next hop address subsequent to providing the second destination address in the ARP entry table by:

providing the second destination address and the first next hop address in the second double-entry in the ARP entry table; and analyzing the first double-entry and the second double-entry to determine that each of the first destination address and the second destination address are associated with the same first next hop address.

12. The IHS of claim 7, wherein the destination addresses are Internet Protocol version 4 (IPv4) addresses.

13. The IHS of claim 7, wherein the next hop addresses are Media Access Control (MAC) addresses.

14. A method for managing Address Resolution Protocol (ARP) tables, comprising:

mapping, by a networking device, destination addresses to next hop addresses using an ARP entry table and an ARP egress table;

determining, by the networking device, that the ARP egress table is full and, in response, mapping destination addresses to next hop addresses in double-entries in the ARP entry table; and determining, by the networking device when the ARP egress table is full, that a second destination address is associated with a first next hop address that is mapped to a first destination address in a first double-entry in the ARP entry table and, in response:

identifying, by the networking device, a third destination address in the ARP entry table that is the only destination address in the ARP entry table that is mapped to a second next hop address in the ARP egress table;

removing, by the networking device, the second next hop address from an ARP egress row in the ARP egress table and map the third destination address to the second next hop address in a second double-entry in the ARP entry table;

providing, by the networking device, the first next hop address in the ARP egress row in the ARP egress table, and provide each of the first destination address and the second destination address in respective ARP entry rows in the ARP entry table; and mapping, by the networking device, each of the first destination address and the second destination address in the respective ARP entry rows in the ARP entry table to the first next hop address in the ARP egress row in the ARP egress table.

15. The method of claim 14, further comprising:

receiving, by the networking device, a data packet generated by a source device;

identifying, by the networking device, the third destination address in the data packet; and performing, by the networking device, ARP operations to determine that the third destination address is associated with the second next hop address and, in response, mapping the third destination address to the second next hop address by:

providing, by the networking device, the third destination address in the ARP entry table in association with a next hop index value; and providing, by the networking device, the second next hop address in the ARP egress table in association with the next hope index value.

16. The method of claim 14, further comprising, while the ARP egress table is full:

receiving, by the networking device, a data packet generated by a source device;

identifying, by the networking device, the first destination address in the data packet; and performing, by the networking device, ARP operations to determine that the first destination address is associated with the first next hop address and, in response, mapping the first destination address to the first next hop address by:

providing, by the networking device, the first destination address and the first next hop address in the first double-entry in the ARP entry table.

17. The method of claim 14, wherein the determining that the second destination address is associated with the first next hop address is performed prior to providing the second destination address in the ARP entry table by:

performing, by the networking device, ARP operations to determine that the second destination address is associated with the first next hop address.

18. The method of claim 14, wherein the determining that the second destination address is associated with the first next hop address is performed subsequent to providing the second destination address in the ARP entry table by:

providing, by the networking device, the second destination address and the first next hop address in the second double-entry in the ARP entry table; and analyzing, by the networking device, the first double-entry and the second double-entry to determine that each of the first destination address and the second destination address are associated with the same first next hop address.

19. The method of claim 14, wherein the destination addresses are Internet Protocol version 4 (IPv4) addresses.

20. The method of claim 14, wherein the next hop addresses are Media Access Control (MAC) addresses.

* * * * *